US012493948B2

(12) United States Patent
Fowler et al.

(10) Patent No.: US 12,493,948 B2
(45) Date of Patent: Dec. 9, 2025

(54) SYSTEMS AND METHODS FOR TROUBLESHOOTING EQUIPMENT INSTALLATION USING ARTIFICIAL INTELLIGENCE

(71) Applicant: Cox Communications, Inc., Atlanta, GA (US)

(72) Inventors: Monte Fowler, Atlanta, GA (US); Lalit Bhatia, Atlanta, GA (US); Jagan Arumugham, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 18/415,238

(22) Filed: Jan. 17, 2024

(65) Prior Publication Data
US 2024/0185409 A1 Jun. 6, 2024

Related U.S. Application Data (63) Continuation of application No. 17/306,542, filed on May 3, 2021, now Pat. No. 11,935,224.

(51) Int. Cl.
*G06T 7/00* (2017.01)
*G06N 3/0464* (2023.01)
(Continued)

(52) U.S. Cl.
CPC ......... *G06T 7/0008* (2013.01); *G06N 3/0464* (2023.01); *G06N 3/09* (2023.01); *G06N 20/00* (2019.01); *G06Q 10/06395* (2013.01); *G06Q 10/20* (2013.01); *G06Q 50/60* (2024.01); *G06T 7/001* (2013.01); *H04L 41/0806* (2013.01); *H04L 41/16* (2013.01); *G06T 2207/20081* (2013.01); *G06T 2207/30108* (2013.01)

(58) Field of Classification Search
CPC .................. G06T 7/0008; G06T 7/001; G06T 2207/20081; G06T 2207/30108; G06N 3/0464; G06N 3/09; G06N 20/00; G06Q 10/06395; G06Q 10/20; G06Q 50/60; H04L 41/0806; H04L 41/16
See application file for complete search history.

(56) References Cited

U.S. PATENT DOCUMENTS

2012/0249588 A1* 10/2012 Tison ..................... G06V 20/20
382/103
2018/0077200 A1* 3/2018 Apvrille ............. H04L 63/1416
(Continued)

*Primary Examiner* — Nay A Maung
*Assistant Examiner* — Jose M Torres
(74) *Attorney, Agent, or Firm* — Eversheds Sutherland (US)

(57) ABSTRACT

The disclosure is directed to, among other things, systems and methods for troubleshooting equipment installations using machine learning. Particularly, the systems and methods described herein may be used to validate an installation of one or more devices (which may be referred to as "customer premises equipment (CPE)" herein as well) at a given location, such as a customer's home or a commercial establishment. As one non-limiting example, the one or more devices may be associated with a fiber optical network, and may include a modem and/or an optical network terminal (ONT). However, the one or more devices may include any other types of devices associated with any other types of networks as well.

19 Claims, 7 Drawing Sheets

(51) Int. Cl.
*G06N 3/09* (2023.01)
*G06N 20/00* (2019.01)
*G06Q 10/0639* (2023.01)
*G06Q 10/20* (2023.01)
*G06Q 50/60* (2024.01)
*H04L 41/0806* (2022.01)
*H04L 41/16* (2022.01)

(56) References Cited

U.S. PATENT DOCUMENTS

| | | | | |
|---|---|---|---|---|
| 2019/0312774 | A1* | 10/2019 | Lehman | H04L 41/22 |
| 2021/0058167 | A1* | 2/2021 | Sheehe | G06V 20/176 |
| 2021/0083992 | A1* | 3/2021 | Didear | H04L 67/75 |
| 2021/0174371 | A1* | 6/2021 | Yoffe | G06F 11/325 |
| 2021/0374406 | A1* | 12/2021 | Brun | G06F 16/24569 |
| 2021/0398355 | A1* | 12/2021 | Fontaine | G06T 15/205 |

\* cited by examiner

SYSTEMS AND METHODS FOR TROUBLESHOOTING EQUIPMENT INSTALLATION USING ARTIFICIAL INTELLIGENCE

CROSS-REFERENCE TO RELATED APPLICATION

This application is a continuation of U.S. patent application Ser. No. 17/306,542, filed May 3, 2021, the contents of which are hereby incorporated by reference in their entirety.

BACKGROUND

In some cases, field technicians may not follow proper procedure when performing equipment installation (for example, installing a network modem, or any other type of device, at a customer premises). This may lead to the customer experiencing issues with network connectivity as the equipment is not properly installed. This may also result in multiple technician visits to resolve the issue and activate the service for the customer. One potential solution to this problem is using quality assurance specialists to review photographs provided by technicians of equipment installation. These quality assurance specialists could then provide feedback about the installation to the technician so that the installation may be fully completed during the initial technician visit. The problem with this approach was that it is a manual process and is not scalable. Deploying quality assurance specialists in every market is time consuming and cost prohibitive. Additionally, the feedback provided by quality assurance specialists is not immediate and may even be provided after the technician has already left the customer location. Thus, even with the use of the quality assurance specialist, multiple technician visits may still be required.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

The disclosure is directed to, among other things, systems and methods for troubleshooting equipment installations using artificial intelligence. Particularly, the systems and methods described herein may be used to validate an installation of one or more devices (which may be referred to as "customer premises equipment (CPE)" herein as well) at a given location, such as a customer's home or a commercial establishment. As one non-limiting example, the one or more devices may be associated with a fiber optical network, and may include a modem and/or an optical network terminal (ONT). However, the one or more devices may include any other types of devices associated with any other types of networks as well.

In some cases, field technicians may not follow proper procedure when performing equipment installation (for example, installing a network modem at a customer premises). This may lead to the customer experiencing issues with network connectivity as the equipment is not properly installed. This may also result in multiple technician visits to resolve the issue and activate the service for the customer. One potential solution to this problem is using quality assurance specialists to review photographs provided by technicians of equipment installation. These quality assurance specialists could then provide feedback about the installation to the technician so that the installation may be fully completed during the initial technician visit. The problem with this approach was that it is a manual process and is not scalable. Deploying quality assurance specialists in every market is time consuming and cost prohibitive. Additionally, the feedback provided by quality assurance specialists is not immediate and may even be provided after the technician has already left the customer location. Thus, even with the use of the quality assurance specialist, multiple technician visits may still be required.

In order to mitigate these potential issues that may arise in equipment installation, artificial intelligence may be used to validate the installations and provide feedback to the technician throughout the installation process (however, the same approach may be used for troubleshooting purposes even beyond the initial equipment installation as described below). In some cases, the validation process may involve the technician capturing one or more images and/or videos (the term "image data" may be used herein to refer to images and/or videos, including real-time videos) of the one or more devices after the one or more devices have been installed by the technician. The installation may involve physical installation of the one or more devices, such as connecting physical connectors. The installation may also involve software and/or firmware configuration, such as configuring certain settings associated with the one or more devices. As one non-limiting example, a technician may be performing an installation for a fiber optic network, and may be installing a modem and an optical network terminal (ONT) at a location. This example installation may involve connecting the ONT to a power outlet, splicing and connecting fiber lines within the media panel to the ONT and connecting an Ethernet line between the ONT and the modem.

Figure 1A:
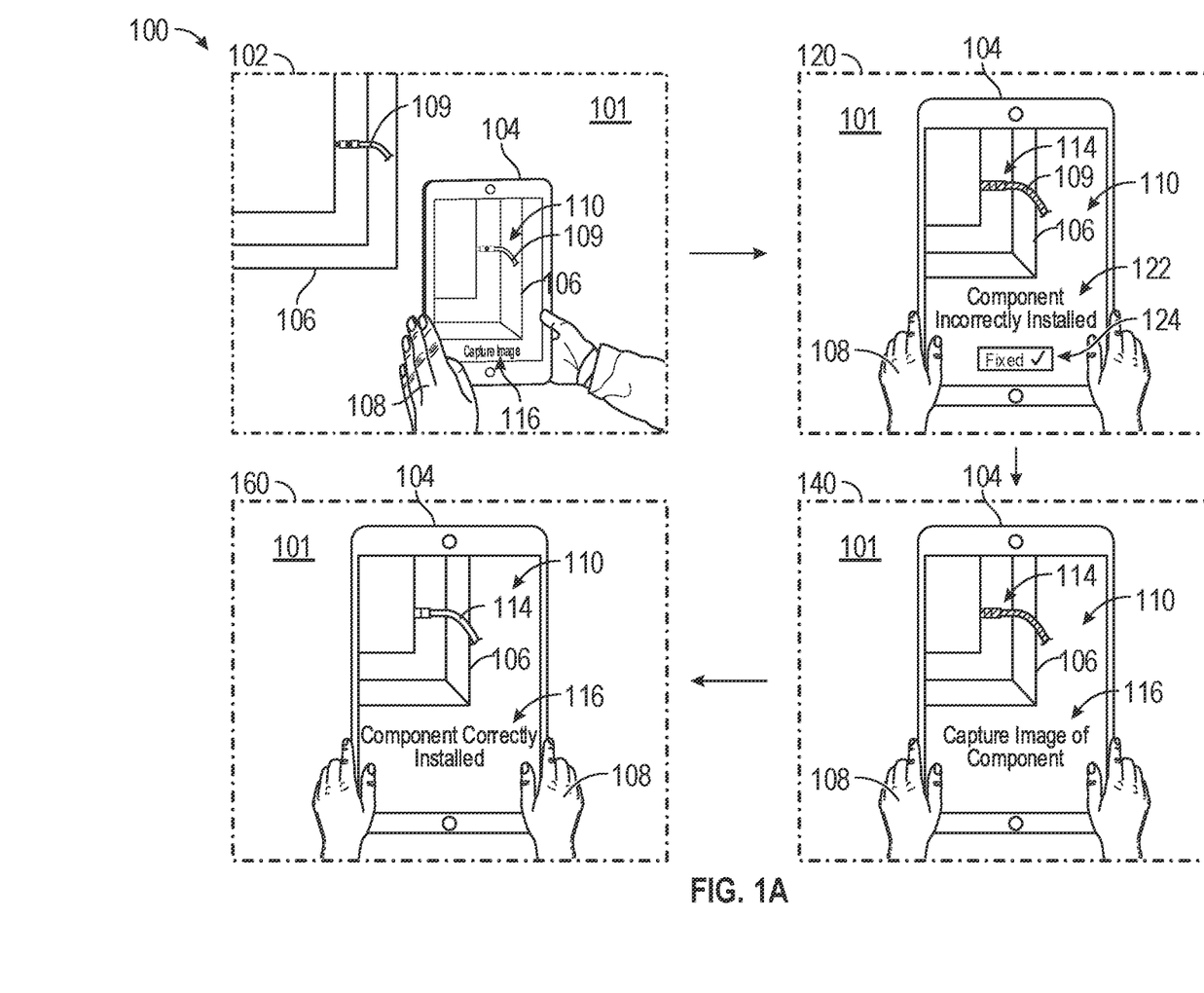
FIG. 1A illustrates an example use case, in accordance with one or more embodiments of this disclosure.
Figure 1B:
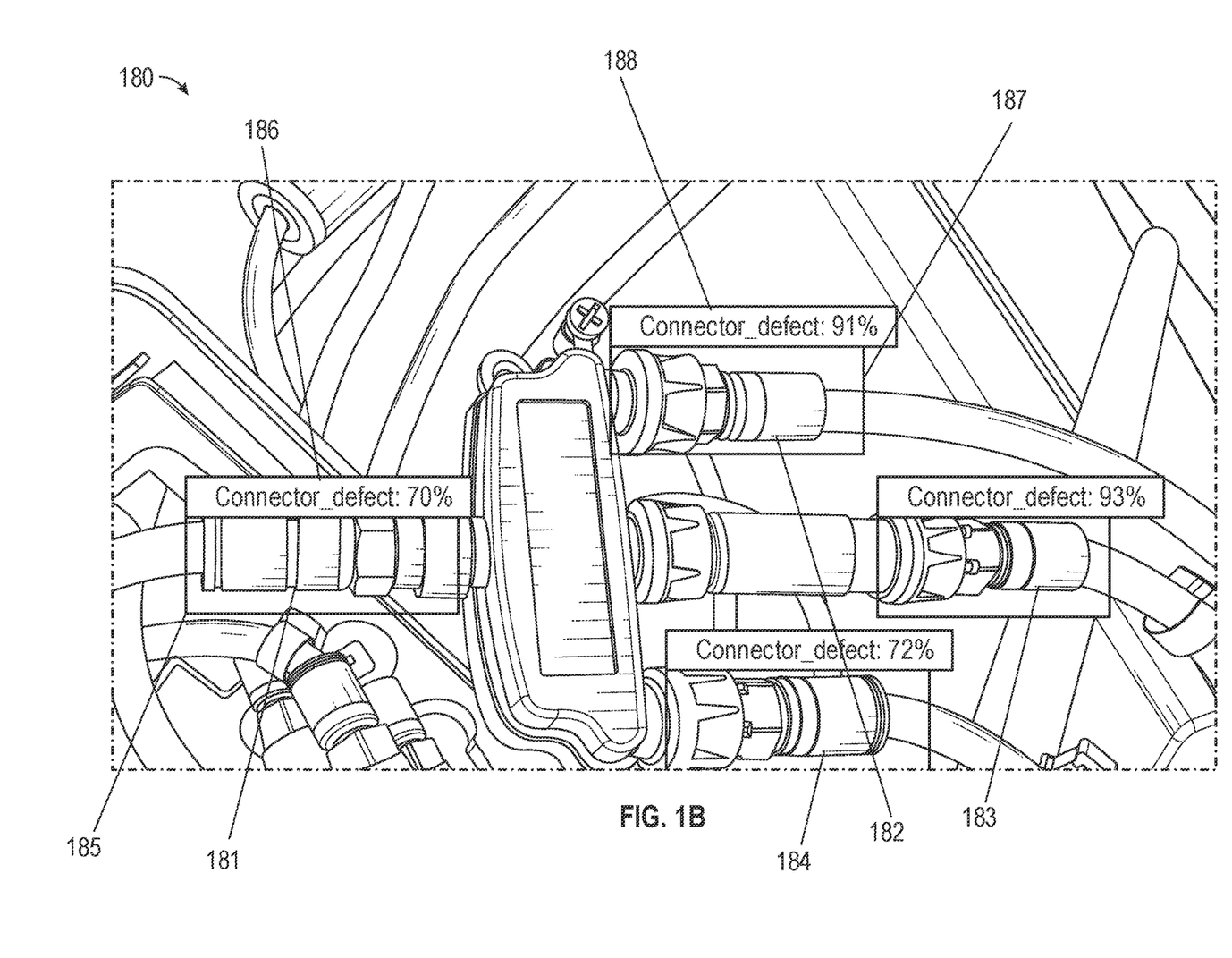
FIG. 1B illustrates an example application interface, in accordance with one or more embodiments of this disclosure.

In some embodiments, the one or more images and/or videos captured to validate the equipment installation may include captures of individual devices or groups of devices. Continuing the above non-limiting example, the captures may include the modem, the ONT, or the modem and the ONT. The one or more images and/or videos may also include captures of particular portions of individual devices. For example, a particular portion may include a fiber connection into and out of the ONT and/or a connection between the ONT and the modem. The one or more images and/or videos may also include captures of the lights flashing on the ONT (for example, status indicators). The captures may also include captures that may provide information about software or firmware configuration of the one or more devices. For example, the technician may capture an image or video of a list of settings that have been configured on the one or more devices (for example, in a fiber optic network an Ethernet wide area networking (EWAN) mode may need to be enabled at installation). In some cases, the captures may be performed using a mobile device including an application. The application may include a user interface that may display to the technician a view of the mobile device camera. The user interface may also provide information to the technician, such as guidance as to which devices and/or portions of devices should be captured. The application may be described in more detail with respect to FIGS. 1-2.

In some embodiments, information may also be provided for analysis by the artificial intelligence outside of the image and/or video captures provided by the technician. For example, Telemetry (monitoring) data can be captured by the equipment itself and sent for analysis. Telemetry data may provide information on the status of the equipment on the network. Such telemetry data may be transmitted over the network for analysis in addition to any images and/or videos provided by the technician. In some cases, the telemetry data may provide information that may not otherwise be ascertainable through an image or video capture. For example, the telemetry data may provide additional information about software and/or firmware configurations.

In some embodiments, once the one or more captures are performed (for example, through the mobile device application or otherwise), the one or more captures may be analyzed using artificial intelligence. The artificial intelligence may include any type of artificial intelligence, including, for example, machine learning, deep learning (for example, convolutional neural networks), and the like. Examples of convolutional neural networks may include regional CNN (R-CNN), fast regional CNN (fast R-CNN), faster regional CNN (Faster R-CNN), you only look once (YOLO), and/or single shot detection (SSD). The artificial intelligence may use image classification and/or object detection. The artificial intelligence may be implemented locally within the mobile device application itself, or may be maintained at a remote location, such as a remote server (or multiple server(s)). The artificial intelligence may receive the one or more captures as inputs, and, using the one or more captures, may identify potential issues with the installation of the one or more devices. For example, the artificial intelligence may identify that a specific connector was not properly connected to a device (this may be illustrated in FIG. 1B), or the artificial intelligence may identify that a setting was not enabled or disabled in software of a device.

In some cases, the artificial intelligence may be pre-trained before being implemented to perform real-time analyses. The pre-implementation training may be performed by providing input data to the artificial intelligence algorithm, while also indicating what the corresponding output(s) should be for the given input data. For example, the input data may be one or more pre-captured images and/or videos of one or more devices as described above. The artificial intelligence may be provided with corresponding outputs for the input data, such that the artificial intelligence may develop an understanding of captures that may be indicative of an issue with the installation. For example, the artificial intelligence may be provided with an image of an ONT with a physical connector that is improperly connected. The artificial intelligence may also be provided with the information that the physical connector in the image is improperly connected. Specifically, in some cases, the image may include one or more labels associated with each of the connectors in the image, where individual labels may provide information about an associated connector. For example, one label may indicate that a particular connector is completely connected, and a second label may indicate that another connector is only 50% connected. The artificial intelligence system may use the correlation between the image and the known issue in the image to build its understanding of what improper physical connections may look like in an image. This, however, is merely one example of how the artificial intelligence may be trained, and the artificial intelligence may also be trained using any other suitable input data. Additionally, the artificial intelligence may also be continuously trained even after being implemented as well. That is, the artificial intelligence may be pre-trained before being implemented to analyze actual equipment installations to establish a baseline understanding of potential installation issues, but may continue to be trained while analyzing actual equipment installations. In this manner, the artificial intelligence may become more effective at identifying potential issues with equipment installations over time as more and more input data is provided to the artificial intelligence (for example, as more and more data is provided for the artificial intelligence to analyze).

Additionally, the images and/or videos used for training the artificial intelligence may be taken from different angles, in different lighting conditions, and at different levels of zoom. The training may also involve parameter tuning. As a first example, data augmentation may be performed on the images and/or videos used for training purposes. For example, data augmentation may involve a random horizontal flip, a random vertical flip, a random 90 degree rotation, a random image scaling, a hue/saturation/brightness change, or an RGB to grayscale change. As a second example, parameter tuning may involve changing a filter size. A filter may move across the image or video to scan the image or video. Using smaller videos may lead to increases in processing time required by the AI. As a third example, parameter tuning may involve changing a stride value. A stride value may be a number of pixels that a filter moves by in each step. Increasing the stride value by a single value may reduce processing time by up to 50%. As a fourth example, parameter tuning may involve changing a batch size. A batch size may include a number of images processed in one pass of data. A larger batch size may require more memory but may also provide a more optimal solution. As a fifth example, parameter tuning may involve dropout regularization, which may help reduce overfitting. Any other parameter tuning may also take place before the AI is implemented in real-time or during operation of the AI in real-time as well.

In some embodiments, once the artificial intelligence algorithm has completed an analysis of any received images and/or videos, one or more instructions may be provided back to the mobile device. An instruction, for example, may be any instruction that may be used to remedy an issue with the one or more devices. An example instruction may include an instruction for the technician to perform an action with respect to the one or more devices. For example, an action may include re-connecting or adjusting a connector that is determined to be improperly connected, enabling or disabling a setting on the one or more devices, and/or any other action that may be used to remedy an issue with the one or more devices. An instruction may also include a request for the technician to provide a subsequent image and/or video capture of the one or more devices such that the artificial intelligence may determine whether the identified issue with the equipment installation has been properly addressed. For example, if the artificial intelligence initially determined that there was an issue with a physical connector to the ONT, the artificial intelligence may analyze the subsequent image or video to determine if the connector issue has been addressed. In some cases, guidance may be provided to the technician through the mobile device application. For example, the application may display on the user interface an indication of a particular issue with the equipment installation that was identified by the artificial intelligence. The application may also provide guidance as to how the identified issue may be remedied, as well as how the subsequent images and/or videos should be captured to provide back to the artificial intelligence for subsequent validation. For example, the user interface may provide textual information to the technician, may provide visual information, or any other types of information. For example, the application may present a view of the camera (which may include the one or more devices) on the display of the mobile device, and may provide an augmented reality overlay over the particular physical component that was identified as being problematic (for example, as illustrated in FIGS. 1A-1B). This may help visually identify for the technician the specific portion of the one or more devices that was improperly installed. The application may also display for the technician a visual representation of how the portion would look if properly installed. For example, if it is determined that a connector is not fully connected to a device, the application may display an image of what a fully connected connector may look like. In some cases, this may be overlaid over the actual connector being presented based on the view of the camera of the mobile device. Furthermore, in some cases, the augmented reality and other information displayed for the technician may be presented in real-time. That is, the technician may not necessarily need to capture an image and/or video of the equipment to send for analysis by the AI. Rather, the technician may simply point a camera of the mobile device (for example, smartphone or the like) running the application at the equipment, and the analysis of the equipment installation may be performed in real-time. The instructions, augmented reality overlays, etc. may be displayed over the real-time video feed being produced by the camera of the mobile device and presented to the technician on the screen of the mobile device through the application.

In some embodiments, an instruction may also include a request for the technician to provide additional images and/or videos. For example, the artificial intelligence may determine that the images and/or videos initially provided do not meet a threshold quality level (for example, an image may be too blurry for analysis). The artificial intelligence may also determine that the images and/or videos may not include some or all of the devices installed during the equipment installation or may not include specific portions of the one or more devices. For example, during a fiber optic installation, a common issue that may occur during installation is an improper connection being made to the ONT. Thus, if the images and/or videos do not include the connection to the ONT, the artificial intelligence may provide an instruction to the mobile device indicating that a subsequent image or video should be provided that does include the particular connection.

In some cases, the systems and methods described herein may also be applied in context beyond equipment installation as well. That is, the systems and methods described herein may be used for troubleshooting purposes even beyond the installation period. For example, if a customer is experiencing a problem with the one or more devices at any time, the customer may take one or more images and/or videos of the one or more devices and may similarly provide the one or more images and/or videos to the artificial intelligence for analysis. The artificial intelligence may then provide similar feedback to the customer that may have been provided to a technician as described above. To this end, the customer may also have a mobile device application that may allow them to perform the captures, provide the captures to the artificial intelligence, and receive instructions from the artificial intelligence. Additionally, in some embodiments, some adjustments made to the one or more devices to correct for an issue (during installation or otherwise) may be performed without the use of a technician as well. For example, in some cases, an issue with one or more devices may include a software, firmware, or other type of issue that may not relate to a physical component of a device. The AI could detect whether the device has the correct/latest version of firmware/software. If the wrong software/firmware were installed, the AI could trigger an automatic push of the correct firmware to the device.

FIG. 1 illustrates an example use case 100. The example use case 100 may illustrate one non-limiting example of how the artificial intelligence described herein may be used to assist a technician in properly completing an equipment installation (or may be used for troubleshooting purposes by a user even after the equipment installation is completed). The use case 100 may begin at scene 102. Scene 102 may depict a user 108 (for example, a technician, a customer, or any other type of user) at a location 101 (for example, a customer premises, a commercial location, or any other location where an equipment installation may be performed). The user 108 may have a mobile device 104 that may include an application. The equipment installation may involve installing one or more devices at the location 101. As one non-limiting example, the one or more devices may be associated with a fiber optical network, and may include a modem (not depicted in the figure) and/or an ONT 106. However, the one or more devices may include any other types of devices associated with any other types of networks as well. The installation may involve physical installation of the one or more devices, such as connecting physical connectors (for example, connector 109). The installation may also involve software and/or firmware configuration, such as configuring certain settings associated with the one or more devices, although software and/or firmware configuration may not necessarily be depicted in the particular use case 100.

The scene 102 may also illustrate aspects of the mobile device application. The application may include a user interface 110 that may present to the user 108 a view of a camera of the mobile device 104. As such, the application shown in scene 102 may depict the ONT 106 and the connector 109. The user interface 100 may also provide information 116 to the technician, such as guidance as to which devices and/or portions of devices should be captured. The guidance may be in any form, such as a textual indication, an audio indication (such as audio stating that the user 108 should capture certain devices and/or portions of devices), a visual indication (for example, a virtual overlay placed over the certain devices and/or portions of devices, such as the overlay 114 depicted in scene 120), and/or any other type of indication. The application may also display a visual representation of how the connector 109 would look if properly installed. For example, if it is determined that a connector 109 is not fully connected to the ONT 106, the application may display an image of what a fully connected connector 109 may look like. In some cases, this may be overlaid over the actual connector 109 being presented based on the view of the camera of the mobile device. The user 108 may then capture one or more images and/or videos of the ONT 106, and the one or more images and/or videos may be provided to the artificial intelligence system (not illustrated in the figure). The artificial intelligence may be implemented locally within the mobile device application itself, or may be maintained at a remote location, such as a remote server (or multiple server(s)).

The use case 100 may continue with scene 120. Scene 120 may involve the mobile device 104 receiving an instruction from the artificial intelligence after the artificial intelligence has analyzed the one or more images and/or videos provided by the mobile device in scene 102. An instruction, for example, may be any instruction that may be used to remedy an issue with the one or more devices. An example instruction may include an instruction for the user 108 to perform an action with respect to the one or more devices. For example, an action may include re-connecting or adjusting the connector 109 of the ONT 106 that is determined by the artificial intelligence to be improperly connected. Based on the instruction, the application of the mobile device 104 may present certain information to the user 108. For example, the user interface 110 of the application may display textual information 122 indicating that a component has been incorrectly installed in the ONT 106 (in this case, for example, the connector 109 has been improperly installed). The textual information 122 may also indicate specific portions of the ONT 106 that were incorrectly installed, such as the connector 109. The user interface 110 may also present one or more selectable elements 124. The selectable elements 124, for example, may include a button on the user interface 110 that the user 108 may select to indicate that they have resolved the issue identified by the artificial intelligence. For example, in the scene 120, the user 108 may select the selectable element 124 to indicate that the issue with the connector 109 has been resolved. Such selectable elements may also be used with the application at other times and for other purposes as well. For example, although not depicted in the use case 100, the user interface may also present selectable elements on the user interface 110 during any of the other scenes (scene 102, scene 140, and/or scene 160). For example, in scene 102, the user interface 110 may present a selectable element that the user 108 may select to indicate that the one or more images and/or videos have been captured and should be provided to the artificial intelligence for analysis.

The use case 100 may continue with scene 140. Scene 140 may involve the application of the mobile device 104 providing an indication to the user 108 to capture one or more subsequent images and/or videos of the one or more devices. For example, scene 140 may specifically depict the user interface 110 of the application displaying a textual notification 116 to the user 108 to capture the one or more images and/or videos. In some cases, the application may also provide guidance to the user 108 to assist the user 108 in properly capturing the one or more images and/or videos. For example, the user interface 110 may present a virtual overlay 114 over the particular physical component that was identified as being problematic. In this case, the virtual overlay 114 may be presented over the ONT 106 to highlight This may help visually identify for the technician the specific portion of the one or more devices that was improperly installed.

Finally, the use case 100 may proceed to scene 160. Scene 160 may involve the application of the mobile device 104 presenting an indication that the issue with the equipment installation identified by the artificial intelligence has been resolved. For example, the user interface 110 may present a textual indication 116 that the connector 109 of the ONT has been correctly installed. The indication, however, may be provided in any other suitable manner, such as an audio notification, an updated virtual overlay (for example, the overlay may change colors from red to green), or any other form of notification to the user 108 that the issue has been resolved. In some cases, the artificial intelligence may identify multiple issues with an equipment installation.

FIG. 1B illustrates an example application interface 180. For example, the application interface 180 may provide one example of information that may be presented to a user (such as a technician) through an application user interface, such as the user interface 110 presented on the mobile device 104 of the use case 100 described with respect to FIG. 1A. This figure may depict an example of equipment that is being installed and/or has already been installed. In this example, the equipment may include multiple connectors (for example, first connector 181, second connector 182, third connector 183, and fourth connector 184). Given that a technician may be installing the equipment (for example, attaching the connectors), there may be inconsistencies in the way the equipment is installed (for example, some connectors may be more securely connected than others). As described above with respect to the use case 100, to remedy this, a technician may capture an image and/or video of the equipment to be analyzed for defects in the equipment installation. Once the analysis is complete, information may be provided to the technician. For example, an image or video may be presented on the user interface of the mobile device including bounding boxes around the different connectors that may provide information pertinent to the individual connectors. For example, the second connector 182 may be provided with a first bounding box 187 that may include first information 188. The first information 188 may indicate a percentage defect of the connector. For example, the first information 188 may indicate that the second connector 182 is only 91% attached. As another example, the first connector 181 may be provided with a second bounding box 185 that may include second information 186. The second information 186 may indicate that the first connector 181 is only 70% attached. This may also be performed in real-time, such that the user may simply point a camera of their mobile device (for example, smartphone or the like) at the equipment, and a live video feed of the equipment may be displayed on the user interface 110 of the mobile device 104. That is, instead of an analysis being performed by a remote system and images and/or videos being returned and displayed on the user interface 110 of the mobile device 104, the first bounding box 187 and second bounding box 185 may be displayed on the user interface 110 in real-time as augmented reality elements. Thus, as the user pans the camera of the mobile device 104 in different directions, the augmented reality elements may remain attached to their associated equipment components. For example, the second bounding box 185 may remain displayed over the first connector 181. Additionally, in some cases, unique indications may be presented to the user when a component defect is below a threshold percentage. For example, a threshold margin of error for installation of the connectors depicted in the figure may be 10%. In this example, the second connector 182 and third connector 183 may be within the acceptable margin of error because they are over 90%. However, the first connector 181 and fourth connector 184 may be outside of this acceptable margin of error. The first connector 181 and fourth connector 184 may be outside of this acceptable margin of error and may be indicated to the user in any number of different manners. For example, the bounding box and/or information provided with respect to the first connector 181 and fourth connector 184 may be a different size, color, etc. than the bounding box and/or information provided with respect to the second connector 182 and third connector 183. The first connector 181 and fourth connector 184 being outside of this acceptable margin of error may also be indicated in any other number of manners, such as the mobile device application providing an auditory warning, highlighting the first connector 181 and fourth connector 184 using augmented reality, or any other type of indication. In some cases, instructions may be provided to the user on how to remedy the specific issues with the first connector 181 and fourth connector 184. For example, textual instructions may be presented on the mobile device application that may instruct the user to screw the connectors in tighter. As a second example, auditory instructions may be provided to the user. As a third example, augmented reality elements may be presented that may visualize for the user how to fix a problem with a specific component, or an augmented reality overlay of what a correctly installed component would look like may be presented. For example, an augmented reality element showing the first connector 181 screwed in further may be presented over the first connector 181 itself on the user interface 110.

Figure 2:
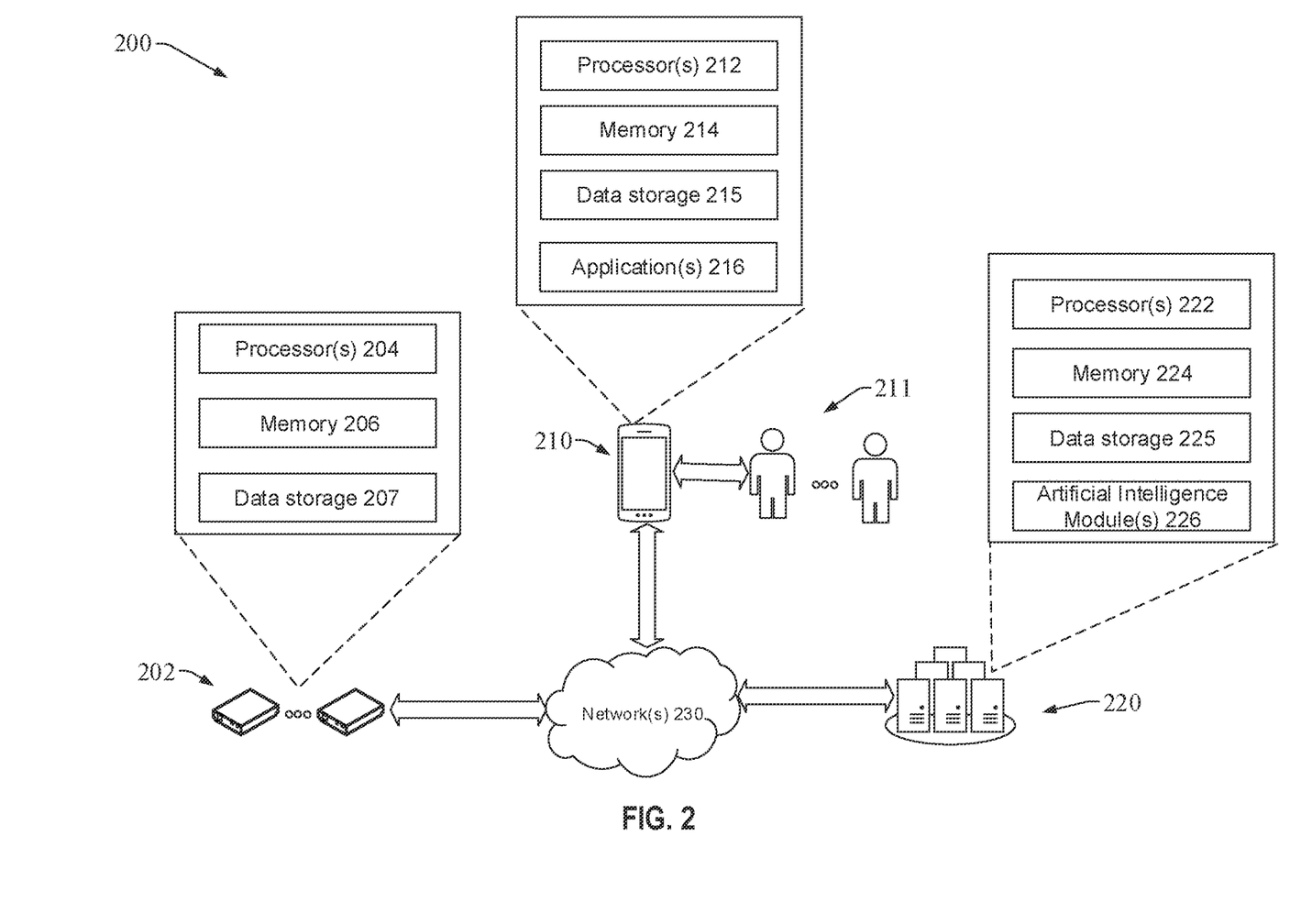
FIG. 2 illustrates an example system architecture, in accordance with one or more embodiments of this disclosure.

FIG. 2 illustrates an example system 200. In some embodiments, the system 200 may include one or more devices 202, one or more mobile devices 210 that may be associated with one or more users 211, and one or more remote servers 220.

In some embodiments, the one or more devices 202 (which may also be referred to as "customer premises equipment (CPE)" herein) may be any devices that may be installed at a given location, such as a customer's home or a commercial establishment. As one non-limiting example, the one or more devices 202 may be associated with a fiber optical network, and may include a modem and/or an optical network terminal (ONT). However, the one or more devices 202 may include any other types of devices associated with any other types of networks as well. The installation may involve physical installation of the one or more devices 202, such as connecting physical connectors. The installation may also involve software and/or firmware configuration, such as configuring certain settings associated with the one or more devices 202.

In some embodiments, the one or more mobile devices 210 may be any device that may be used by one or more users 211 to perform any of the operations described herein. For example, a mobile device may be a smartphone, tablet, laptop, or any other type of device. A user 211 may be, for example, a technician performing an installation of the one or more devices 202, a customer who may be using the one or more devices 202 after the installation, or any other user. A mobile device may also include one or more application(s) 216. The application may include a user interface that may display to the technician a view of the mobile device camera.

In some embodiments, the one or more remote servers 220 may store artificial intelligence that may be used to analyze any images and/or videos provided captured by a mobile device 210 (however, in some cases, the artificial intelligence may also be implemented in the one or more devices 202 and/or the one or more mobile devices 210 as well). The artificial intelligence may also be used to analyze any other information provided about the one or more devices 202 (during installation or even subsequent to installation), such as any signals provided by the one or more devices 202 to the one or more remote servers 220. The artificial intelligence may include any type of artificial intelligence, including, for example, machine learning, deep learning, and the like. The artificial intelligence may be implemented locally within the mobile device application itself, or may be maintained at a remote location, such as a remote server (or multiple server(s)). The artificial intelligence may receive the one or more captures as inputs, and, using the one or more captures, may identify potential issues with the installation of the one or more devices. For example, the artificial intelligence may identify that a specific connector was not properly connected to a device, or the artificial intelligence may identify that a setting was not enabled or disabled in software of a device. The artificial intelligence may be pre-trained before being implemented to perform real analyses. In some cases, the pre-implementation training may be performed by providing input data to the artificial intelligence algorithm, while also indicating what the corresponding output(s) should be for the given input data. For example, the input data may be one or more pre-captured images and/or videos of one or more devices as described above. The artificial intelligence may be provided with corresponding outputs for the input data, such that the artificial intelligence may develop an understanding of captures that may be indicative of an issue with the installation. For example, the artificial intelligence may be provided with an image of an ONT with a physical connector that is improperly connected. The artificial intelligence may also be provided with the information that the physical connector in the image is improperly connected. The artificial intelligence system may use the correlation between the image and the known issue in the image to build its understanding of what improper physical connections may look like in an image. This, however, is merely one example of how the artificial intelligence may be trained, and the artificial intelligence may also be trained using any other suitable input data. Additionally, the artificial intelligence may also be continuously trained even after being implemented as well. That is, the artificial intelligence may be pre-trained before being implemented to analyze actual equipment installations to establish a baseline understanding of potential installation issues, but may continue to be trained while analyzing actual equipment installations. In this manner, the artificial intelligence may become more effective at identifying potential issues with equipment installations over time as more and more input data is provided to the artificial intelligence (for example, as more and more data is provided for the artificial intelligence to analyze).

Any of the elements of the system 200 (for example, one or more devices 202, one or more mobile devices 210, and one or more remote servers 220) may include one or more processors (for example, processor(s) 204, processor(s) 212, processor(s) 222, or any other processor(s)) that may include any suitable processing unit capable of accepting digital data as input, processing the input data based on stored computer-executable instructions, and generating output data. The computer-executable instructions may be stored, for example, in the data storage (for example, data storage 207, data storage 215, and/or data storage 225, or any other data storage) and may include, among other things, operating system software and application software. The computer-executable instructions may be retrieved from the data storage and loaded into the memory (for example, memory 206, memory 214, memory 224, or any other memory) as needed for execution. The processor may be configured to execute the computer-executable instructions to cause various operations to be performed. Each processor may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage may store program instructions that are loadable and executable by the processors, as well as data manipulated and generated by one or more of the processors during execution of the program instructions. The program instructions may be loaded into the memory as needed for execution. The memory may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications (for example, application(s) 216 on the one or more mobile devices 210, and/or the artificial intelligence module(s) 226 at the one or more severs 220), or the like may be stored in data storage that may comprise computer-executable instructions that when executed by one or more of the processors cause various operations to be performed. The memory may have loaded from the data storage one or more operating systems (O/S) that may provide an interface between other application software (for example dedicated applications, a browser application, a web-based application, a distributed client-server application, etc.) executing on the server and the hardware resources of the server. More specifically, the O/S may include a set of computer-executable instructions for managing the hardware resources of the server and for providing common services to other application programs (for example managing memory allocation among various application programs). The O/S may include any operating system now known or which may be developed in the future including, but not limited to, any mobile operating system, desktop or laptop operating system, mainframe operating system, or any other proprietary or open-source operating system. In some instances, any of the elements described with respect to system 200 (for example, one or more devices 202, one or more mobile devices 210, and one or more remote servers 220), as well as any other elements described herein, may also include any aspects of the example computing device 600 described with respect to FIG. 6 below.

Any of the one or more devices 202, one or more mobile devices 210, and one or more remote servers 220, may be configured to communicate with each other and any other component of the system 200 via one or more communication networks 230. The communication network 230 may include, but is not limited to, any one or a combination of different types of suitable communications networks such as, for example, cable networks, public networks (for example the Internet), private networks, wireless networks, cellular networks, or any other suitable private and/or public networks. Further, the communication network 230 may have any suitable communication range associated therewith and may include, for example, global networks (for example the Internet), metropolitan area networks (MANs), wide area networks (WANs), local area networks (LANs), or personal area networks (PANs). In addition, the communication network 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Figure 3:
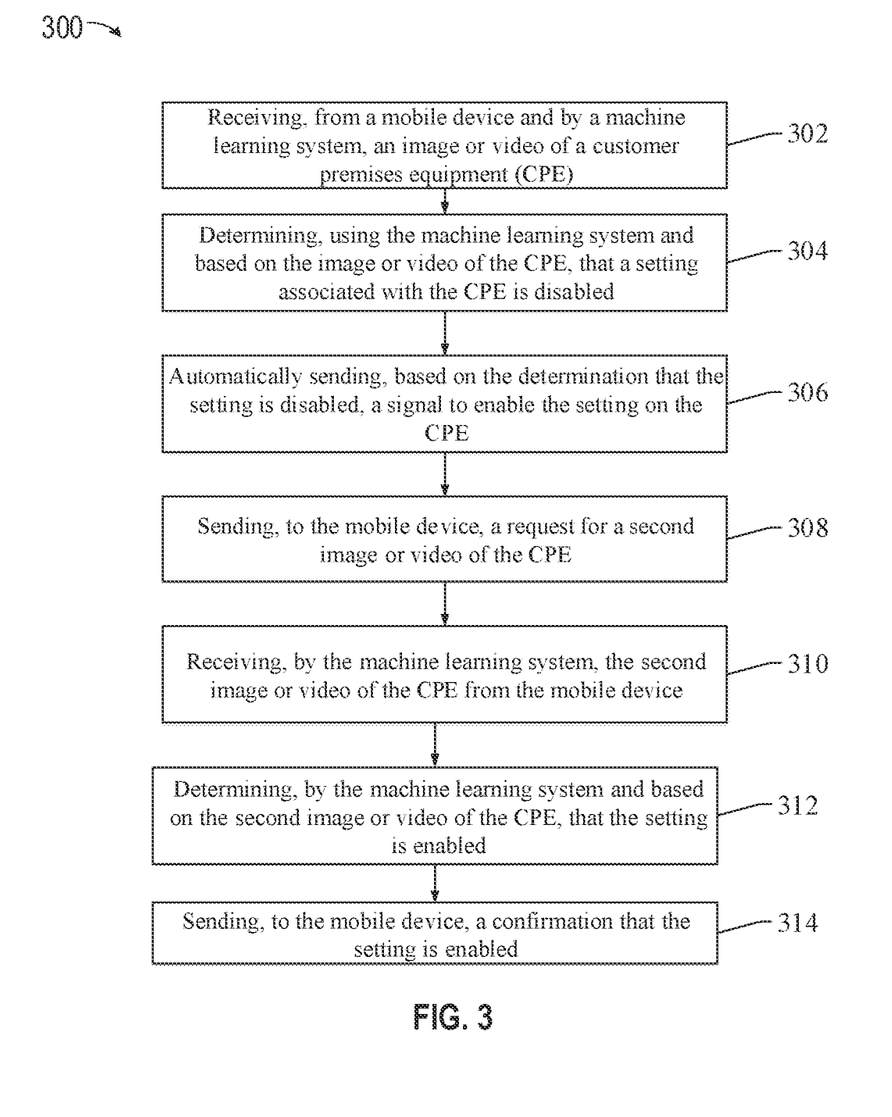
FIG. 3 illustrates an example method, in accordance with one or more embodiments of this disclosure.

FIG. 3 is an example method 300. At block 302 of the method 300 in FIG. 3, the method 300 may include receiving, from a mobile device and by an artificial intelligence system, image data of a customer premises equipment (CPE). Block 304 of the method 300 may include determine, using the artificial intelligence system and based on the image data of the CPE, that a setting associated with the CPE is disabled. Block 306 of the method 300 may include automatically send, based on the determination that the setting is disabled, a signal to enable the setting on the CPE. Block 308 of the method 300 may include sending, to the mobile device, a request for second image data of the CPE. Block 310 of the method 300 may include receiving, by the artificial intelligence system, the second image data of the CPE from the mobile device. Block 312 of the method 300 may include determining, by the artificial intelligence system and based on the second image data of the CPE, that the setting is enabled. Block 314 of the method 300 may include sending, to the mobile device, a confirmation that the setting is enabled.

In some embodiments, the method 300 may include determining, by the artificial intelligence, that the image data fails to meet a threshold quality level or fails to include the CPE. The method 300 may include sending, to the mobile device, an indication to send third image data of the CPE. The method 300 may also include receiving the third image data from the mobile device. The method 300 may also include determining that the third image data meets the threshold quality level or includes the CPE. The method 300 may also include sending, to the mobile device, an indication that the third image data meets the threshold quality level or includes the CPE.

In some embodiments, the method 300 may also include sending, to the mobile device and by the machine learning, a request for third image data including a component of the CPE. The method 300 may also include receiving the third image data from the mobile device. The method 300 may also include determining that the third image data includes the component of the CPE.

In some embodiments, the method 300 may also include determining, by the machine learning and based on the image data of the CPE, that a component of the CPE is incorrectly installed. The method 300 may also include sending, to the mobile device, an indication that the component of the CPE is incorrectly installed and a request for the mobile device to provide third image data of the CPE. The method 300 may also include receiving the third image data of the CPE. The method 300 may also include determining, based on the third image data of the CPE, that the component is correctly installed.

In some embodiments, the method 300 may also include sending, prior to receiving the image data from the mobile device, a signal to the CPE. The method 300 may also include determining that a response signal is not received from the CPE. The method 300 may also include sending, prior to receiving the image data from the mobile device and based on the response signal from the CPE, a request for the mobile device to capture image data of the CPE.

In some embodiments, the method 300 may also include sending, prior to receiving the image or video from the mobile device, a signal to the CPE. The method 300 may also include receiving a response signal from the CPE. The method 300 may also include sending, prior to receiving the image data from the mobile device and based on the response signal not being received from the CPE, a request for the mobile device to capture image data of the CPE.

Figure 4:
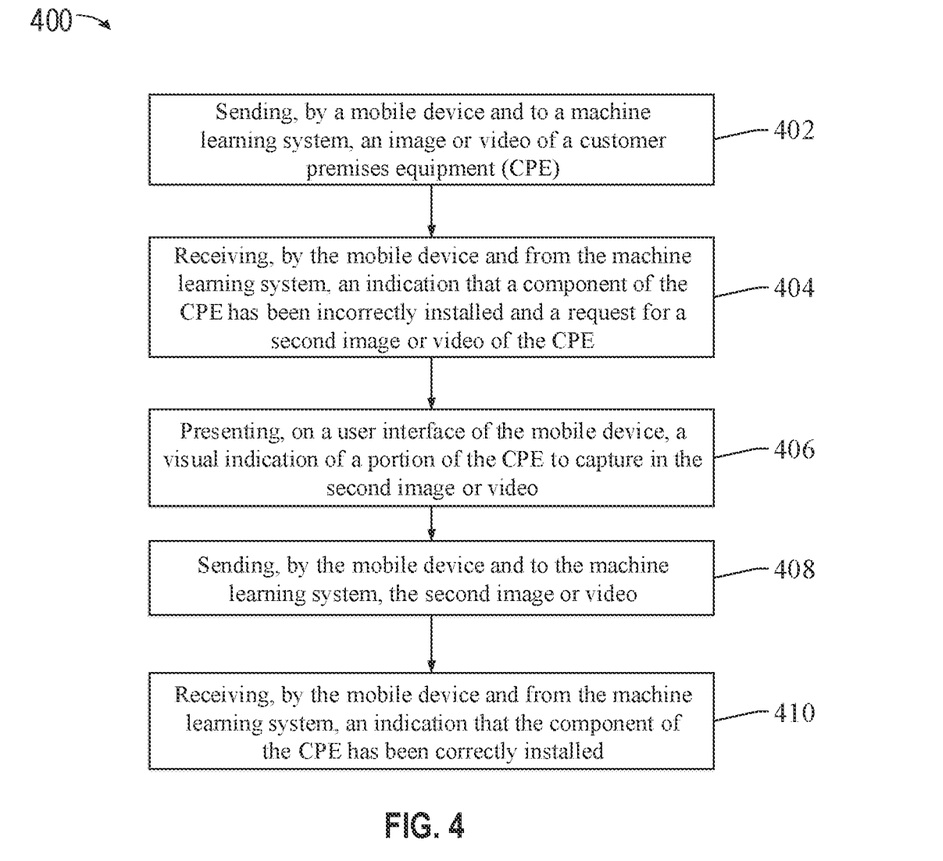
FIG. 4 illustrates an example method, in accordance with one or more embodiments of this disclosure.

FIG. 4 is an example method 400. At block 402 of the method 400 in FIG. 4, the method 400 may include sending, by a mobile device and to a machine learning system, image data of a customer premises equipment (CPE). Block 404 of the method 400 may include receiving, by the mobile device and from the machine learning system, an indication that a component of the CPE has been incorrectly installed and a request for second image data of the CPE. Block 406 of the method 400 may include presenting, on a user interface of the mobile device, a visual indication of a portion of the CPE to capture in the second image data. Block 408 of the method 400 may include sending, by the mobile device and to the machine learning system, the second image data. Block 410 of the method 400 may include receiving, by the mobile device and from the machine learning system, an indication that the component of the CPE has been correctly installed.

In some embodiments, the method 400 may also include receiving, by the mobile device, an indication that the image data fails to meet a threshold quality level or fails to include the CPE, and for the mobile device to provide third image data of the CPE. The method 400 may also include sending the third image data to the machine learning system. The method 400 may also include by the mobile device, an indication that the third image data meets the threshold quality level or includes the CPE.

In some embodiments, the method 400 may also include receiving, from the machine learning system, a request for third image data including a component of the CPE. The method 400 may also include sending the third image data to the machine learning system.

In some embodiments, the method 400 may include receiving, by the mobile device and based on a determination that a setting of the CPE is disabled, a request for second image data of the CPE. The method 400 may also include sending the second image data of the CPE to the machine learning system. The method may also include receiving, by the mobile device and from the machine learning system, a confirmation that a setting is enabled on the CPE. The method 400 may also include receiving, prior to sending the image data to the machine learning system, a request to capture image data of the CPE.

Figure 5:
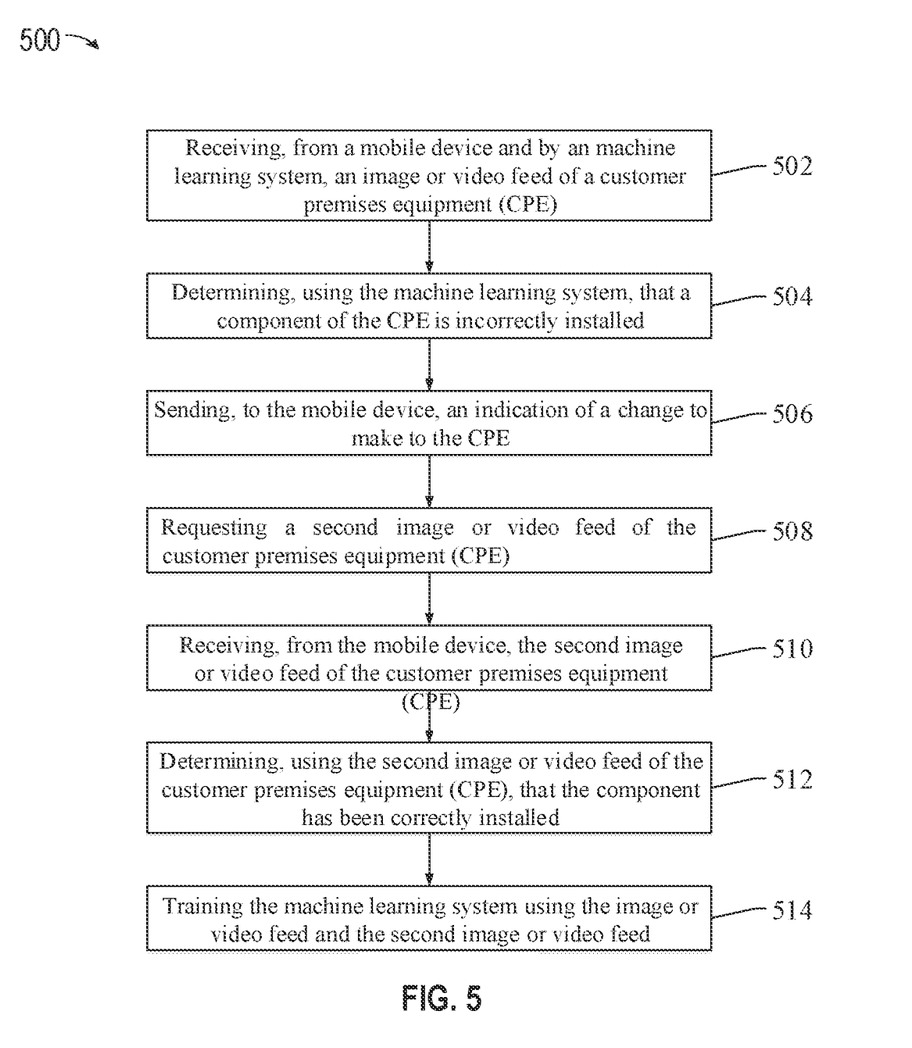
FIG. 5 illustrates an example method, in accordance with one or more embodiments of this disclosure.

FIG. 5 is an example method 500. At block 502 of the method 500 in FIG. 5, the method 500 may include receiving, from a mobile device and by an artificial intelligence system, image data of a customer premises equipment (CPE). Block 504 of the method 500 may include determining, using the artificial intelligence system, that a component of the CPE is incorrectly installed. Block 506 of the method 500 may include sending, to the mobile device, an indication of a change to make to the CPE. Block 508 of the method 500 may include requesting, from the mobile device, second image data of the customer premises equipment (CPE). Block 510 of the method 500 may include receiving from the mobile device, the second image data of the customer premises equipment (CPE). Block 512 of the method 500 may include determining, using the second image data of the customer premises equipment (CPE), that the component has been correctly installed. Block 514 of the method 500 may include training the artificial intelligence system using the image data and the second image data.

In some embodiments, the method 500 may also include determining, using the machine learning system and based on the image data of the CPE, that a setting associated with the CPE is disabled. The method 500 may also include automatically sending, based on the determination that the setting is disabled, a signal to enable the setting on the CPE. The method 500 may also include sending, to the mobile device, a request for second image data of the CPE. The method 500 may also include receiving the second image data of the CPE from the mobile device. The method 500 may also include determining, based on the second image data of the CPE, that the setting is enabled. The method 500 may also include sending, to the mobile device, a confirmation that the setting is enabled.

In some embodiments, the method 500 may also include determining that the image data fails to meet a threshold quality level or fails to include the CPE. The method 500 may also include sending, to the mobile device, an indication for the mobile device to provide third image data of the CPE. The method 500 may also include receiving the third image data from the mobile device. The method 500 may also include determining that the third image data meets the threshold quality level or includes the CPE. The method 500 may also include sending, to the mobile device, an indication that the third image data meets the threshold quality level or includes the CPE.

In some embodiments, the method 500 may also include sending, to the mobile device, a request for third image data including a component of the CPE. The method 500 may also include the third image data from the mobile device. The method 500 may also include determining that the third image data includes the component of the CPE.

In some embodiments, the method 500 may also include sending, prior to receiving the image data from the mobile device, a signal to the CPE. The method 500 may also include receiving a response signal from the CPE. The method 500 may also include sending, prior to receiving the image data from the mobile device and based on the response signal from the CPE, a request for the mobile device to capture image data of the CPE.

In some embodiments, the method 500 may also include sending, prior to receiving the image data from the mobile device, a signal to the CPE. In some embodiments, the method 500 may also include determining that a response signal is not received from the CPE. The method 500 may also include sending, prior to receiving the image data from the mobile device and based on the response signal not being received from the CPE, a request for the mobile device to capture image data of the CPE.

Figure 6:
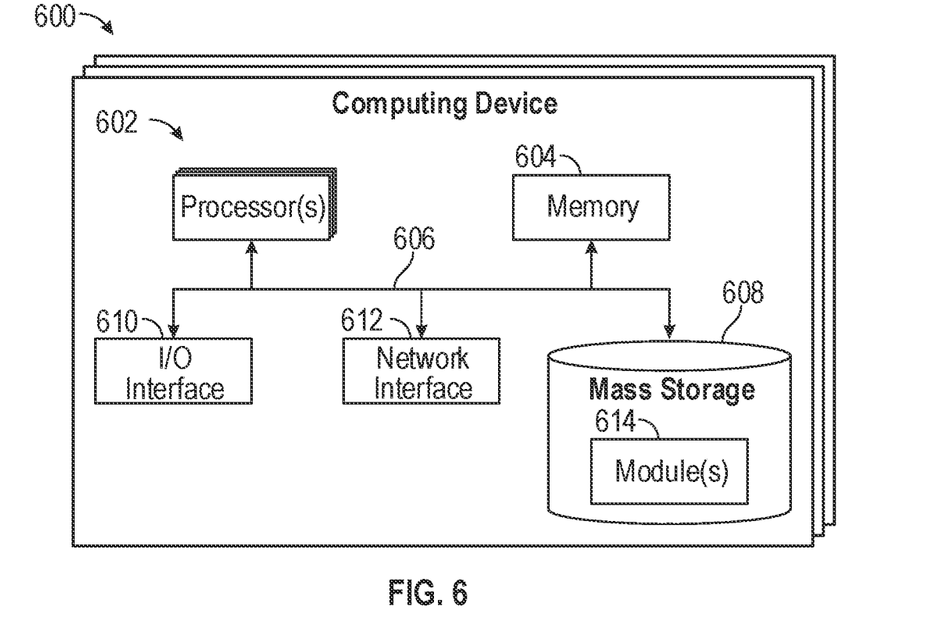
FIG. 6 illustrates an example of a computing system, in accordance with one or more embodiments of this disclosure.

FIG. 6 illustrates an example computing device 600, in accordance with one or more embodiments of this disclosure. The computing 600 device may be representative of any number of elements described herein, such as the one or more devices 202, one or more mobile devices 210 that may be associated with one or more users 211, and one or more remote servers 220 described with respect to FIG. 2, or any other elements described herein. The computing device 600 may include at least one processor 602 that executes instructions that are stored in one or more memory devices (referred to as memory 604). The instructions can be, for instance, instructions for implementing functionality described as being carried out by one or more modules and systems disclosed above or instructions for implementing one or more of the methods disclosed above. The processor(s) 602 can be embodied in, for example, a CPU, multiple CPUs, a GPU, multiple GPUs, a TPU, multiple TPUs, a multi-core processor, a combination thereof, and the like. In some embodiments, the processor(s) 602 can be arranged in a single processing device. In other embodiments, the processor(s) 602 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 602 can access the memory 604 by means of a communication architecture 606 (e.g., a system bus). The communication architecture 606 may be suitable for the particular arrangement (localized or distributed) and type of the processor(s) 602. In some embodiments, the communication architecture 606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 604 also can retain data, such as any ledger 156 information, among other data.

Each computing device 600 also can include mass storage 608 that is accessible by the processor(s) 602 by means of the communication architecture 606. The mass storage 608 can include machine-accessible instructions (e.g., computer-readable instructions and/or computer-executable instructions). In some embodiments, the machine-accessible instructions may be encoded in the mass storage 608 and can be arranged in components that can be built (e.g., linked and compiled) and retained in computer-executable form in the mass storage 608 or in one or more other machine-accessible non-transitory storage media included in the computing device 600. Such components can embody, or can constitute, one or many of the various modules disclosed herein. Such modules are illustrated as modules 614.

Execution of the modules 614, individually or in combination, by at least one of the processor(s) 602, can cause the computing device 600 to perform any of the operations described herein (for example, the operations described with respect to FIGS. 3-5, as well as any other operations).

Each computing device 600 also can include one or more input/output interface devices 610 (referred to as I/O interface 610) that can permit or otherwise facilitate external devices to communicate with the computing device 600. For instance, the I/O interface 610 may be used to receive and send data and/or instructions from and to an external computing device. The computing device 600 also includes one or more network interface devices 612 (referred to as network interface(s) 612) that can permit or otherwise facilitate functionally coupling the computing device 600 with one or more external devices. Functionally coupling the computing device 600 to an external device can include establishing a wireline connection or a wireless connection between the computing device 600 and the external device. The network interface devices 612 can include one or many antennas and a communication processing device that can permit wireless communication. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment,"

"system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
   a processor; and
   memory storing computer-executable instructions, that when executed by the processor, cause the processor to:
   send, by a mobile device and to a machine learning system, image data of a customer premises equipment (CPE);
   receive, by the mobile device and from the machine learning system, an indication that a first component of the CPE has been incorrectly installed; and
   present, via a user interface of the mobile device and based on the indication that the first component has been incorrectly installed, a first augmented reality element associated with the first component of the CPE,
   wherein the first component is a connector, and wherein the first augmented reality element includes a percentage amount the connector is inserted into the CPE.

2. The system of claim 1, wherein the computer-executable instructions further cause the processor to:
   present, via the mobile device, instructions to remedy an installation defect associated with the first component.

3. The system of claim 2, wherein the instructions include at least one of: text-based instructions, auditory instructions, or an augmented reality overlay depicting the first component as correctly installed.

4. The system of claim 1, wherein the first augmented reality element is a bounding box provided over the first component.

5. The system of claim 1, wherein the computer-executable instructions further cause the processor to:

receive, by the mobile device and from the machine learning system, an indication that a second component of the CPE has been incorrectly installed;
determine that the second component is associated with a first installation defect value that is outside a threshold margin of error; and
present, via the user interface of the mobile device, a second augmented reality element associated with the second component of the CPE, wherein the second augmented reality element is different than the first augmented reality element based on the determination that the second component is associated with a first installation defect value that is outside a threshold margin of error.

6. The system of claim 1, wherein the CPE is a modem or an optical network terminal (ONT).

7. The system of claim 1, wherein the computer-executable instructions further cause the processor to:
determine that the connector is only partially inserted into the CPE, wherein the percentage is between 0 and 100; and
present, via a user interface of the mobile device, a second augmented reality element visualizing the connector fully inserted into the CPE.

8. The system of claim 1, wherein the computer-executable instructions further cause the processor to:
determine, by the machine learning model, that the image data fails to meet a threshold quality level or fails to include the CPE;
send, to the mobile device, an indication to send third image data of the CPE;
receive the third image data from the mobile device;
determine that the third image data meets the threshold quality level or includes the CPE; and
send, to the mobile device, an indication that the third image data meets the threshold quality level or includes the CPE.

9. A method comprising:
sending, by a mobile device and to a machine learning system, image data of a customer premises equipment (CPE);
receiving, by the mobile device and from the machine learning system, an indication that a first component of the CPE has been incorrectly installed; and
presenting, via a user interface of the mobile device and based on the indication that the first component has been incorrectly installed, a first augmented reality element associated with the first component of the CPE,
wherein the first component is a connector, and wherein the first augmented reality element includes a percentage amount the connector is inserted into the CPE.

10. The method of claim 9, further comprising:
presenting, via the mobile device, instructions to remedy an installation defect associated with the first component.

11. The method of claim 10, wherein the instructions include at least one of: text-based instructions, auditory instructions, or an augmented reality overlay depicting the first component as correctly installed.

12. The method of claim 9, wherein the first augmented reality element is a bounding box provided over the first component.

13. The method of claim 9, further comprising:
receiving, by the mobile device and from the machine learning system, an indication that a second component of the CPE has been incorrectly installed;
determining that the second component is associated with a first installation defect value that is outside a threshold margin of error; and
presenting, via the user interface of the mobile device, a second augmented reality element associated with the second component of the CPE, wherein the second augmented reality element is different than the first augmented reality element based on the determination that the second component is associated with a first installation defect value that is outside a threshold margin of error.

14. The method of claim 9, wherein the CPE is a modem or an optical network terminal (ONT).

15. A non-transitory computer-readable medium storing computer-executable instructions, that when executed by one or more processors, cause the one or more processors to:
receive, by a mobile device, real-time image data of a customer premises equipment (CPE);
determine, by the mobile device and based on the real-time image data, that a first component of the CPE has been incorrectly installed; and
present, via a user interface of the mobile device, in real-time, and based on the determination that the first component has been incorrectly installed, a first augmented reality element associated with the first component of the CPE,
wherein the first component is a connector, and wherein the first augmented reality element includes a percentage amount the connector is inserted into the CPE.

16. The non-transitory computer-readable medium of claim 15, wherein the computer-executable instructions further cause the one or more processors to:
present, via the mobile device, instructions to remedy an installation defect associated with the first component.

17. The non-transitory computer-readable medium of claim 16, wherein the instructions include at least one of: text-based instructions, auditory instructions, or an augmented reality overlay depicting the first component as correctly installed.

18. The non-transitory computer-readable medium of claim 15, wherein the first augmented reality element is a bounding box provided over the first component.

19. The non-transitory computer-readable medium of claim 15, wherein the computer-executable instructions further cause the one or more processors to:
determine, by the mobile device, that a second component of the CPE has been incorrectly installed;
determine that the second component is associated with a first installation defect value that is outside a threshold margin of error; and
present, via the user interface of the mobile device, a second augmented reality element associated with the second component of the CPE, wherein the second augmented reality element is different than the first augmented reality element based on the determination that the second component is associated with a first installation defect value that is outside a threshold margin of error.

* * * * *